United States Patent [19]

Faroudja

[11] Patent Number: 5,097,332
[45] Date of Patent: Mar. 17, 1992

[54] PROCESSING METHOD FOR WIDE-ASPECT-RATIO TELEVISION SIGNAL FOR STANDARDS-COMPATIBLE TRANSMISSION AND DISPLAY

[76] Inventor: Yves C. Faroudja, 26595 Anacapa Dr., Los Altos Hills, Calif. 94022

[21] Appl. No.: 517,616

[22] Filed: May 2, 1990

[51] Int. Cl.$^5$ .............................................. H04N 7/08
[52] U.S. Cl. ...................................... 358/141; 358/12; 358/142
[58] Field of Search ................. 358/141, 142, 147, 12, 358/11

[56] References Cited

U.S. PATENT DOCUMENTS

| | | | |
|---|---|---|---|
| 4,567,508 | 1/1986 | Hulyer | 358/12 X |
| 4,847,676 | 7/1989 | Oliphant et al. | 358/141 X |
| 4,959,717 | 9/1990 | Faroudja | 358/147 |

OTHER PUBLICATIONS

Y. Kimata, Y. Araki, S. Takayama, "Study of the Methods of Signal Processing Applicable to Wide Aspect EDTV Compatible with NTSC", paper presented at Nat'l Assn of Broadcasters, Atlanta, Ga., Apr. 2, 1990.

*Primary Examiner*—Victor R. Kostak
*Attorney, Agent, or Firm*—David B. Harrison

[57] ABSTRACT

A television signal processing method for processing a wide-aspect-ratio television signal into a conventional four-to-three standard aspect ratio signal for transmission and display. The method includes an encoding process and a decoding process for wide-aspect-ratio display. No decoding is needed for display of a central panel of the encoded signal upon conventional television receivers. The encoding process includes dividing the signal vertically into the central panel, separated by two side panels. The side panel pixel information is then placed within horizontal bands formed above and below the central panel for transmission to either a conventional display for displaying the central panel, or for an enhanced wide-aspect-ratio display for decoding and displaying the wide-aspect-picture signal. Amplitude and time compression techniques and shuffling of the side panel segment information are aspects of the present invention.

16 Claims, 5 Drawing Sheets

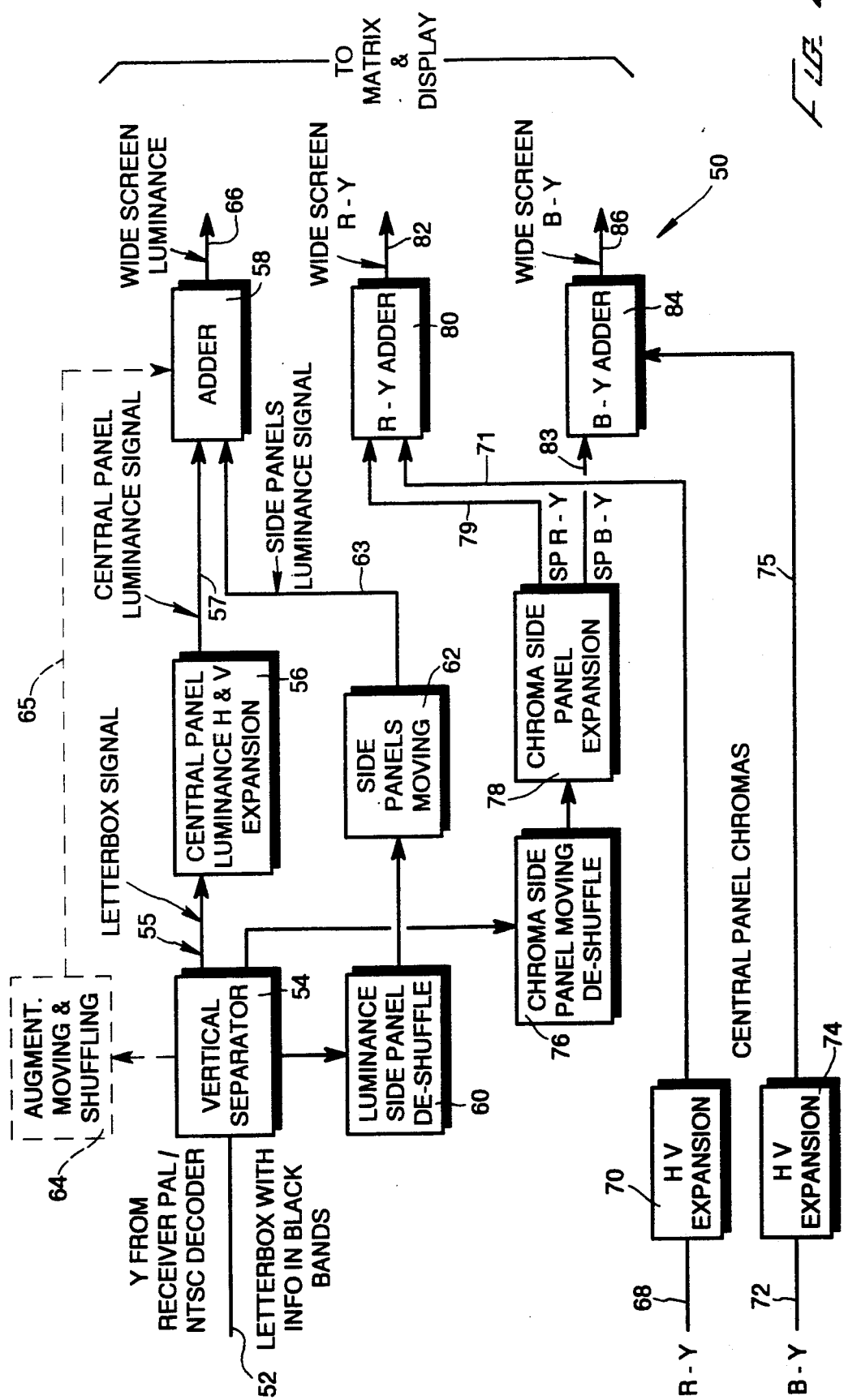

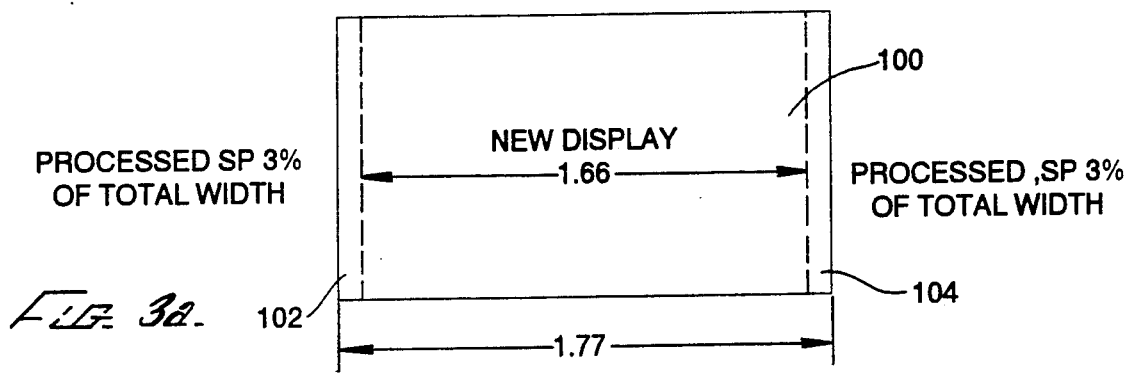
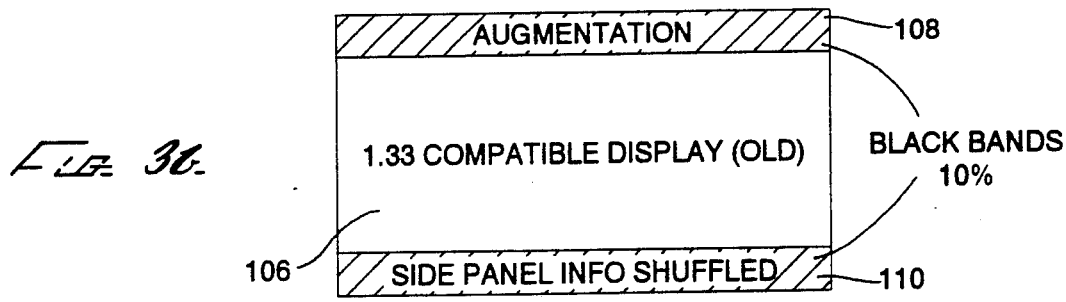
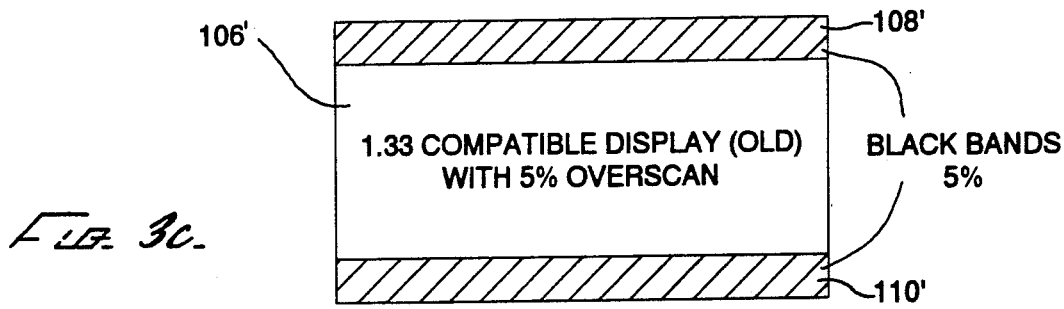

SIDE PANELS INFO AMPLITUDE

ALTERNATED POLARITY   COMPRESSED SP BLACKS

COMPRESSED

PROCESSING METHOD FOR WIDE-ASPECT-RATIO TELEVISION SIGNAL FOR STANDARDS-COMPATIBLE TRANSMISSION AND DISPLAY

FIELD OF THE INVENTION

The present invention relates to signal processing methods and systems for raster scan television systems. More particularly, the present method relates to a method and system for providing a wide-aspect-ratio picture display in a manner which is downwardly compatible with existing television picture display equipment.

BACKGROUND OF THE INVENTION

A general consensus has arisen within the television broadcast industry that a television picture being displayed should have an aspect ratio of roughly 16 units wide by nine units high (1.777). This desireably wide aspect ratio is quite different from the present 4 units by 3 units (1.333) aspect ratio of the conventional television picture. Thus, there is a basic artistic incompatibility between the proposed wide aspect ratio (1.777) and the existing, conventional aspect ratio (1.333).

Different approaches have been proposed in order to solve the incompatibility between these two aspect ratios. The present inventor has proposed a compromise, namely an aspect ratio of about 1.6, which lies between the wide aspect ratio and the narrow, conventional aspect ratio. With this approach, and taking into account the common practice of overscanning the television display device, a very little black band appears at the top and bottom of the picture. It is vaguely compatible and be somewhat wider than the conventional 1.333 ratio. This approach has not met with widespread acceptance. In the vernacular, it is neither fish nor fowl, and is not seen to provide the aesthetic quality to the picture obtainable with the 1.777 wide aspect ratio.

Two approaches have been proposed. Workers at the David Sarnoff Center have proposed a side panel approach in which side panel information from both sides of the picture image is packed into spectral space within the existing bandwidth, or is contained within the spectrum of an adjacent channel. While this approach is downwardly compatible, the implementation is very complicated and expensive, and receivers adapted to make use of the additional side panel information are also very complicated and expensive.

The other approach is known as a letter box approach. In this approach a letter box pattern is presented on the screen (horizontal black bands at the top and bottom of the picture). On new wide aspect ratio displays, the full display screen is filled. And, the horizontal black bands at the top and bottom of the picture display on the old, conventional display may be filled with augmentation signals to improve resolution or reduce noise in the visible picture. The present inventor's U.S. Pat. No. 4,959,717 provides a description of a method for masking reinforcement signals in the horizontal bands resulting from the letter box approach.

Workers at NTV have proposed a compromise between the side panel approach and the letter box approach. In the downwardly compatible mode, an aspect ratio of about 1.6 is presented, and on new television display devices a full 1.777 wide aspect ratio is presented. The NTV approach makes use of pixel thinning out techniques for thinning out the number of pixels on the side panels, so that low frequency pixel components (one third) remain in the side panels and the high frequency pixel components (two thirds) are moved to scan lines at the top or bottom of the picture which are not so visible on account of overscan. This approach is outlined in a paper presented by Y. Kimata, Y Araki and S. Takayama of Nippon Television Network Corp., Tokyo, Japan (NTV) at the National Association of Broadcasters in Atlanta, Ga. on Apr. 2, 1990 and entitled "Study of the Methods of Signal Processing Applicable to the Wide Aspect EDTV Compatible with NTSC". While this approach has been demonstrated to be feasible, the implementation on a pixel thinning basis is complicated and expensive at both encoder and decoder.

Thus, a hitherto unsolved need has arisen for a wide aspect ratio television system which is asethetically compatible with existing conventional 1.333 aspect ratio picture displays and which enables an enhanced wide aspect ratio display to be realized at far greater simplicity and lower cost than heretofore.

SUMMARY OF THE INVENTION WITH OBJECTS

A general object of the present invention is to provide a compatible wide aspect ratio television system which overcomes the limitations and drawbacks of the prior art.

In accordance with the principles of the present invention, a method is provided for encoding a wide-aspect-ratio raster scan television picture image in a manner which is downwardly compatible with existing narrower aspect ratio television picture display equipment. In accordance with this invention the encoding method includes the steps of:

dividing the wide aspect ratio television picture image vertically into a central panel and two side panels, namely a left side panel and a right side panel at each side of the central panel and wherein the side panels are not substantially greater in area than about twenty percent of the area of the central panel and wherein each one of a multiplicity of wide aspect ratio scan lines of the raster scan includes a central panel segment and two side panel segments, forming horizontal bands of scan lines at the top and bottom of a resultant raster scan picture image, adding each side panel scan line segment to a predetermined scan line position within a predetermined scan line of one of the horizontal bands of the resultant raster scan picture image so that a scan line thereof includes plural side panel segments in predetermined arrangement, placing the central panel in the space between the top and bottom horizontal bands of the resultant raster scan picture image, and putting out the resultant raster scan picture image to a transmission path leading to a picture display.

One aspect of the present invention comprises the step of forming each horizontal band so as not to exceed fifteen percent, and most preferably not more than ten percent, of the display area of the resultant raster scan picture image.

In a further aspect of the present invention, a further step of shuffling each side panel segment prior to adding it to the said horizontal band is carried out so as to minimize any coherence between picture content of the central panel picture and activity within the horizontal bands.

In one more aspect of the present invention, a further step for compressing the scan lines of the central panel prior to placement into the said space between the top and bottom bands is carried out, so that the picture information originally contained in the central panel now fits within the remaining scan lines of the space between the top and bottom bands.

In a still further aspect of the present invention, a further step is carried out for amplitude compressing level transitions in each side panel scan segment prior to its addition to the predetermined scan line position within the said band.

In one more aspect of the present invention, further steps of generating an augmentation signal for augmenting the quality of the said wide aspect ratio picture image, compressing the augmentation signal into augmentation segments, and placing the augmentation segments into predetermined scan line positions within the top and bottom bands are carried out. In this aspect, the augmentation signals may be carried in one or the other of the top and bottom bands, or the bands may be divided, with some of the augmentation signals carried in a portion of the top band, and other ones of the augmentation signals carried in a portion of the bottom band, etc.

In yet another aspect of the present invention, further step are performed for separating chrominance components of the side panel scan line segments from chroma components of the central panel scan line segments, compressing the separated side panel chroma scan line segments, and adding the compressed and separated side panel chroma scan line segments at predetermined scan line positions within at least one of the top and bottom bands of luminance information.

In still one more aspect of the present invention a further step of time compressing the luminance components of the separated side panel segments before they are inserted into the said predetermined positions within the scan lines of the top or bottom bands.

As a separate and distinct facet of the present invention, a method is provided for decoding for display a wide-aspect-ratio raster scan television picture image which has been encoded by the steps of:

dividing the wide aspect ratio television picture image vertically into a central panel and two side panels at the left and right sides of the central panel wherein the area of the side panel not substantially greater than twenty percent of the area of the central panel and wherein each one of a multiplicity of wide aspect ratio scan lines of the raster scan includes a central panel segment and two side panel segments, forming horizontal bands of scan lines at the top and bottom of a resultant raster scan picture image, adding each side panel segment to a predetermined scan line position within a predetermined scan line of one of the horizontal bands of the resultant raster scan picture image so that a scan line thereof includes plural side panel segments in predetermined arrangement, placing the central panel in the space between the top and bottom horizontal bands of the resultant raster scan picture image, and putting out the resultant raster scan picture image. In this decoding method, the following steps are carried out:

separating the top and bottom horizontal bands from the space therebetween, extracting the central panel scan segments from the space, extracting the side panel picture scan segments from the scan lines of the top or bottom bands, and adding the side panel picture scan segments to corresponding central panel scan segments in proper time relationship to restore the multiplicity of wide aspect ratio scan lines, and displaying the restored wide aspect ratio scan lines on a wide aspect ratio display.

In this decoding method, the aspects and enhancements noted above for encoding may also be included, providing they are included within the encoding process.

These and other objects, aspects, advantages and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 is a block diagram of a decoding process for decoding a television picture signal which has been encoded by the FIG. 1 encoding process.

FIG. 3A depicts a wide aspect ratio display area in accordance with the present invention.

FIG. 3B depicts a conventional 1.33 aspect ratio television display showing letter box panels at the top and bottom containing shuffled line segments from the side panels in accordance with the principles of the present invention.

FIG. 3C depicts a conventional display with the typically introduced 5% overscan which effectively masks or hides a substantial portion of the top and bottom display.

DETAILED DESCRIPTION OF A PREFERRED EMBODIMENT

Figure 1:
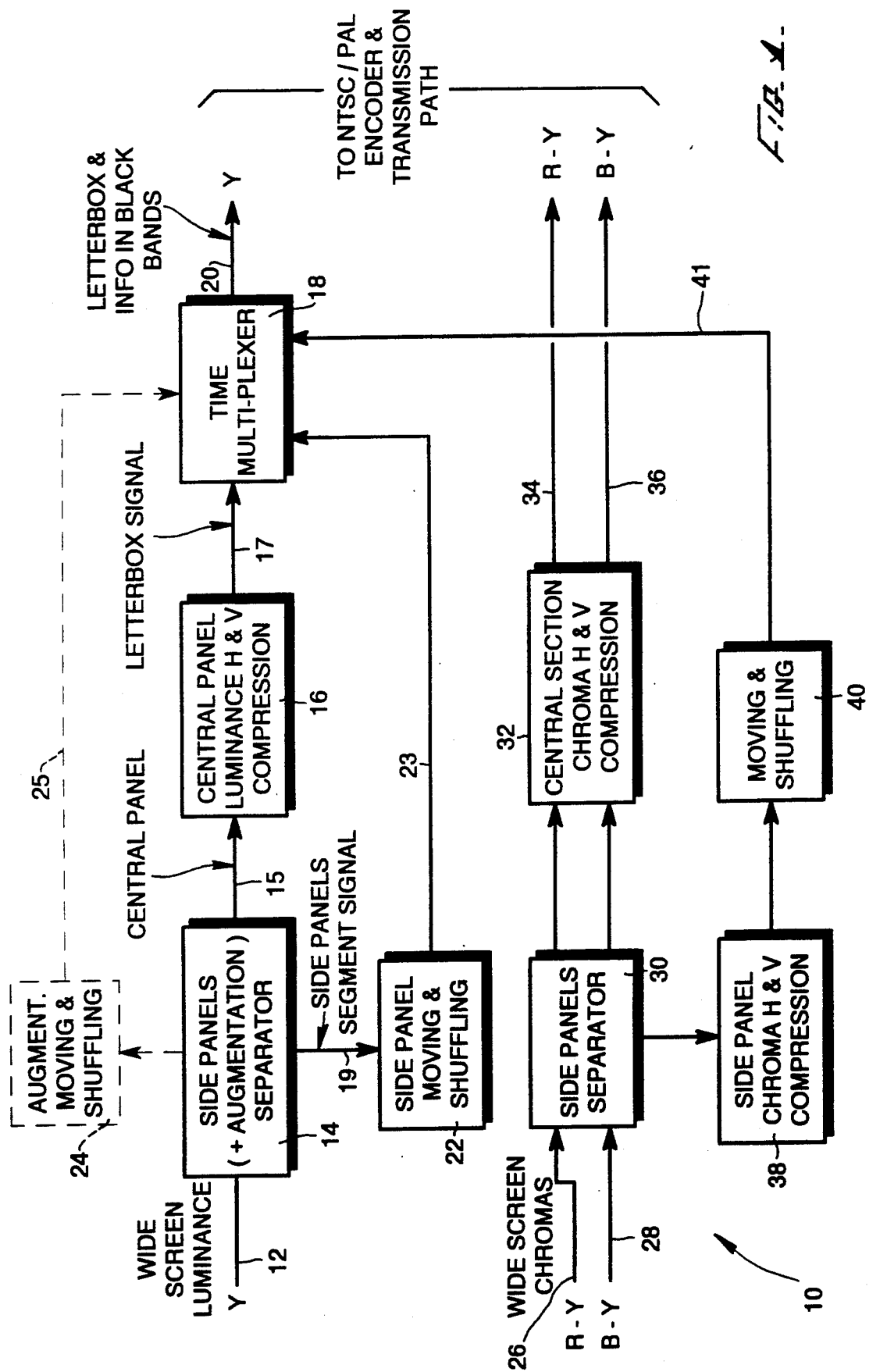
FIG. 1 is a block diagram of an encoding process for encoding a television signal in accordance with the principles of the present invention in order to realize a compatible wide aspect ratio television system.

The present invention combines the letter box approach and the side panels approach in order to make black bands narrower and thus less aesthetically unpleasing on conventional displays while reducing the complexity of side panels manipulation within display systems presenting a full 1.777 wide aspect picture ratio. Accordingly, the left and right side panel pixels of a 1.777 aspect ratio image are moved on a scan line segment by scan line segment basis and arranged lineally in the upper and lower black bands of a 1.6 to 1.66 aspect ratio image otherwise fully compatible with the NTSC television signal format standard, for example. One of the horizontal bands is sufficient to contain all of the side panels scan line segments, leaving the other band available for augmentation signals such as noise reduction signals or resolution enhancement signals.

It may be advantageous to reduce the amplitude and the set-up (pedistal) of the side panel pixel information in order to hide it more effectively in the top or bottom horizontal band. With a display CRT manifesting a conventional gamma characteristic of 3, for example, and with a slightly negative setup, a 0.714 volt peak becomes 0.04 volts. In this case the light level of side panel peak whites will be $(0\ 4/0.714)^3$ which is about 17% of the main picture peak white levels as displayed on the CRT. The black peak levels can also be amplitude compressed, resulting in a reduction of dynamic range of the side panels pixel information.

The side panels information may be "shuffled" according to a pseudo-random sequence, and the polarity of the signal may be alternated on a field by field basis for more complete visual randomization. Preferably, the shuffling and randomization is carried out in accordance with the methods taught in the inventor's referenced U.S. Pat. No. 4,959,717 in order to reduce or eliminate any coherence in the upper and lower horizontal bands with the main picture content.

Chroma processing of side panels information requires a separate and distinct signal area for transmission and reception. If it is assumed that horizontal and vertical chroma resolution are each one quarter the resolution of corresponding horizontal and vertical picture components, the area to be reserved for chrominance is only 12.5% of the luminance area. With a one fifth resolution, only 8% of the luminance area need be reserved for chroma. The unmodulated red minus luminance (R-Y) and blue minus luminance (B-Y) chroma values for the side panels are averaged over a four or five scan line period, then time compressed in a ratio of four or five, and then shuffled as was done with the luminance side panel scan line segments.

Another embodiment of the present invention makes use of both black bands when an augmentation signal is not used. In this case, the aspect ratio of the useful portion of the compatible image on a 1.333 aspect ratio display is only 1.54, and the black bands are only eight percent of total height each. With overscan, the black bands are then only two percent of the overall height.

A further embodiment within the scope of the present invention is to accept a loss of resolution for side panel picture information, compress the side panel information by a factor such as four (as by reducing horizontal and vertical bandwidth by one half each), and then insert the compressed side panel information in very narrow upper and lower black bands. In this case the aspect ratio of the visible portion of the compatible image will be 1.50, and with conventional overscan, there will be no visible appearance of these very narrow upper and lower bands on the conventional display tube screen.

With reference to FIG. 1 encoding apparatus implementing principles of the present invention includes an input 12 for receiving a wide aspect ratio picture signal otherwise in accordance with a predetermined signal format, such as NTSC or PAL. The wide screen picture signal enters a side panels and augmentation signal separator circuit 14 which separates the side panels scan line segments and develops augmentation signals. A central panel signal 15 is sent to a central panel horizontal and vertical compression circuit 16 where the central panel video information is compressed so that a predetermined reduced number of scan lines carries all of the central panel video information. A resultant output from the circuit 16 is a letterbox picture signal 17 in accordance with the conventional 1.333 aspect ratio. This signal 17 is provided to a time multiplexer circuit 18. An output 20 from the time multiplexer provides a letterbox picture in conventional aspect ratio and side panels information in the upper and lower black bands.

Side panels scan line segments 19 separated by the side panels separator circuit 14 are delivered to a side panels moving and shuffling circuit 22 which moves each scan line segment of the side panel into a time slot within a scan line within an upper or lower black band. The scan line segments are preferably shuffled in accordance with the teachings of the referenced U.S. Pat. No. 4,959,717 so that they do not present any coherence with the central panel video displayed on the conventional television display screen. The moving and shuffling circuit 22 also preferably reduces the amplitudes of peak white and black and reduces the set up, so that the entire dynamic picture range is carried within a low luminance level gray scale range. An output path 23 from the moving and shuffling circuit 22 provides the black band scan lines carrying the side panels information to the time multiplexer circuit 18.

The side panels and augmentation separator circuit 14 may optionally extract or develop an augmentation signal for picture reinforcement. Such a signal, which is preferably developed in accordance with the teachings of the referenced U.S. Pat. No. 4,959,717 (Ser. No. 07/454,369) is sent to an augmentation signal moving and shuffling circuit 24 which shuffles and repacks the augmentation signals into otherwise unused scan lines within the black bands and puts the scan lines out to the time multiplexer 18 over a path 25.

The time multiplexer combines the compressed central panel scan lines 17 in conventional aspect ratio letter box format with the scan lines carrying the side panels scan line segments 23 in shuffled format and the scan lines carrying the augmentation signals 25 in shuffled format in proper time relationship to develop a composite compatible picture signal in letter box format (i.e. with black horizontal bands at the top and bottom). The composite signal is put out over the output path 20 to an NTSC or PAL encoder and transmission path.

Red minus luminance chroma information 26 and blue minus luminance chroma information 28 enter a side panels chroma separator circuit 30 where the side panels chroma scan line segments are separated from the central panel chroma. The central panel chrominance is passed to a central panel horizontal and vertical compression circuit 32 which compresses the chroma information in like measure as occurred in the central panel luminance compression circuit 16. An output 34 provides compressed central panel red minus luminance chrominance; and an output 36 provides compressed central panel blue minus luminance chrominance. The chroma signals 34 and 36 lead to the conventional NTSC/PAL encoder and transmission path.

The side panels chroma information separated by the chroma separator circuit 30 pass to a side panels chroma horizontal and vertical compression circuit 38 which applies a predetermined compression in the horizontal and vertical domains. As noted previously, four times or five times compression of the side panels chrominance information is most preferred. The compressed side panels chrominance information is then passed through a moving and shuffling circuit 40 which repositions the chrominance information into available scan lines within the upper or lower black bands (it being remembered that the compressed side panels chrominance is moved to different spatial locations than corresponding luminance information). The side panels black band chrominance information 41 is then passed to the time multiplexer circuit 18 for addition into the luminance path within the black band region. The composite signal on the line 20 may then be displayed on a conventional display with a resultant letterbox appearance, and it may also be displayed in original wide aspect ratio format on an improved device including a decoder 50 for decoding and reassenbling the picture into its original wide aspect ratio format.

FIG. 2 shows the structure of the decoder 50 for decoding the letter box compatible composite picture signal encoded by the encoder 10 of FIG. 1 into a wide aspect picture signal. The luminance from a receiver comprising the information packed into the output signal 20 by the encoder 10 is received at an input 52 and passed to a vertical interval separator circuit 54 which separates the black bands from the main panel picture information. Separated letter box format luminance 55 is passed to a central panel luminance horizontal and vertical expansion circuit 56 which restores the central panel luminance to its original resolution. This restored central panel luminance 37 is supplied as an input to an adder circuit 58.

Separated luminance side panels information is applied to a deshuffling circuit 60 which deshuffles the luminance scan line segments of the side panels in accordance with an inverse of the shuffling key applied by the shuffling circuit 22. A luminance side panels moving circuit 62 moves the side panels scan segments back to their original position in the original wide aspect ratio picture and puts out the properly moved and timed scan line segments 63 to the adder circuit 58.

An augmentation signal deshuffling and moving circuit 64, if augmentation signals are present, deshuffles the augmentation signals and moves them into proper time relationship for augmenting the entire wide aspect ratio picture. These augmentation signals 65 are also passed to the adder 58.

The adder 58 combines the decoded central panel luminance 57, decoded and moved side panels luminance 63 and decoded and moved augmentation signals 65 in proper time and phase relationship into a wide aspect ratio luminance picture signal 66 which is put out to the display device.

Central panel red minus luminance chrominance 68 passes through a horizontal and vertical expansion circuit 70 which expands this R-Y chroma component into its original bandwidth and puts it out over a path 71 to a red minus luminance adder circuit 80. Central panel blue minus luminance chroma 72 passes through a horizontal and vertical expansion circuit 74 which expands this B-Y chroma component into its original bandwidth and puts it out over a path 75 to a blue minus luminance adder circuit 84.

Side panels R-Y and B-Y chroma components carried in the black bands of the luminance component are separated by the vertical separator 54 and pass through a chroma side panels deshuffling and moving circuit 76 which deshuffles them according to an inverse of the original shuffling key and returns them to their original spatial places in the side panels of the wide aspect ratio picture. The chroma side panels R-Y and B-Y components are then given bandwidth expansion by an expansion circuit 78. Bandwidth restored R-Y chroma 79 is then added to central panel restored bandwidth Y chroma 79 is then added to central panel restored bandwidth R-Y chroma in the R-Y adder circuit 80 and put out as a R-Y wide aspect ratio chroma composite on a path 82 to the display. Bandwith restored B-Y chroma 83 is then added to central panel restored bandwidth B-Y chroma in the B-Y adder circuit 84 and put out as a B-Y wide aspect ratio chroma composite on a path 86 to the display.

The results of the foregoing processing will be more clearly understood by reference to the pictorial graphs in FIGS. 3A, 3B and 3C. FIG. 3A depicts the new wide aspect ratio display screen area 100 having an aspect ratio of 1.777. It is seen by inspection that the left processed side panel 102 and the right processed side panel 104 each amounts to only three percent of the total width of the 1.777 wide aspect ratio picture.

FIG. 3B shows a compatible display 106 in conventional format. In this 1.333 conventional aspect ratio display, there is no overscan, and an upper horizontal black band 108 and a lower horizontal black band 110 carry the shuffled and relocated side panels segment s as well as shuffled and relocated chroma and augmentation signals. No overscan is present in the display 106, and each black band 108 and 110 takes up approximately ten percent of the total picture area.

FIG. 3C illustrates the reduction of appearance of the black bands by the ubiquitous practice of overscan. Overscan of five percent reduces the upper black band 108' to only five percent of the picture area 106' and reduces the lower black band 110' by the same amount.

Figure 4A:
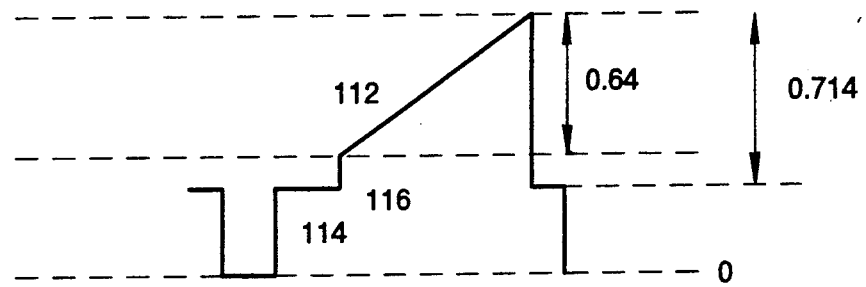
FIGS. 4A, 4B and 4C are graphs showing compression and alternation of side panel blocks.
Figure 4B:
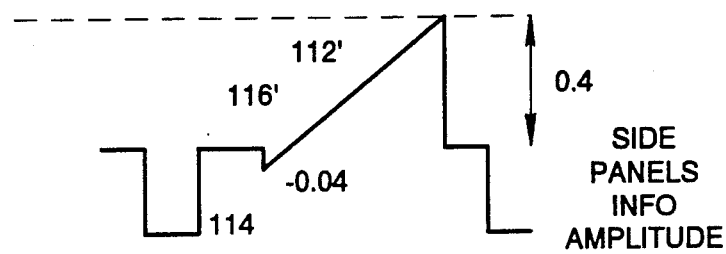

FIG. 4A illustrates a conventional black to white transition 112 within a picture signal including a sync pulse 114 and a pedistal or set up 116. FIG. 4B illustrates amplitude reduction of the black and white peaks of the transition 112' such that the black peak is reduced to −0.04 below the sync threshold and the white peak is reduced to 0.4. The pedistal 16' is now negative, instead of being a positive set up value.

Figure 4C:
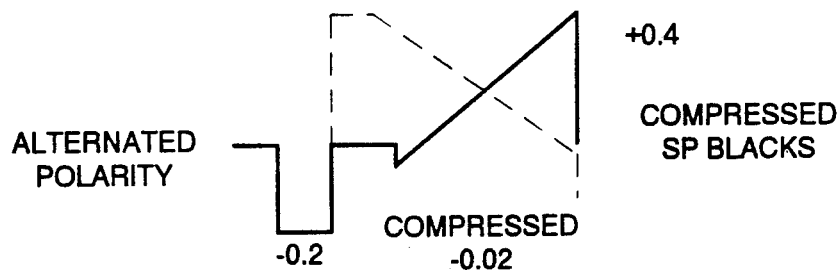

FIG. 4C shows the waveform effect of alternating the polarity of the FIG. 4B compressed black to white transition on a field by field basis, thereby reducing the visibility thereof substantially within the black band.

Figure 5:
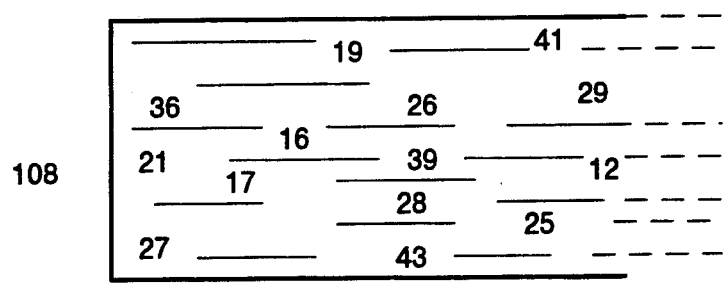
FIG. 5 is an enlargement diagram showing side panel information carried in the top and bottom bands of the conventional television picture signal.

FIG. 5 illustrates in magnified, highly diagrammatic format, the effect of shuffling the side panels information within the black band wherein each segment number represents a scan line number for the segment in the original picture, thereby rendering the information contained in the scan lines of the black bands incoherent with respect to activity and motion within the central panel picture. In this manner, the viewer of a conventional picture display will not become annoyed by any picture-coherent activity otherwise perceptible within the upper and lower black bands 108 and 110.

Figure 6:
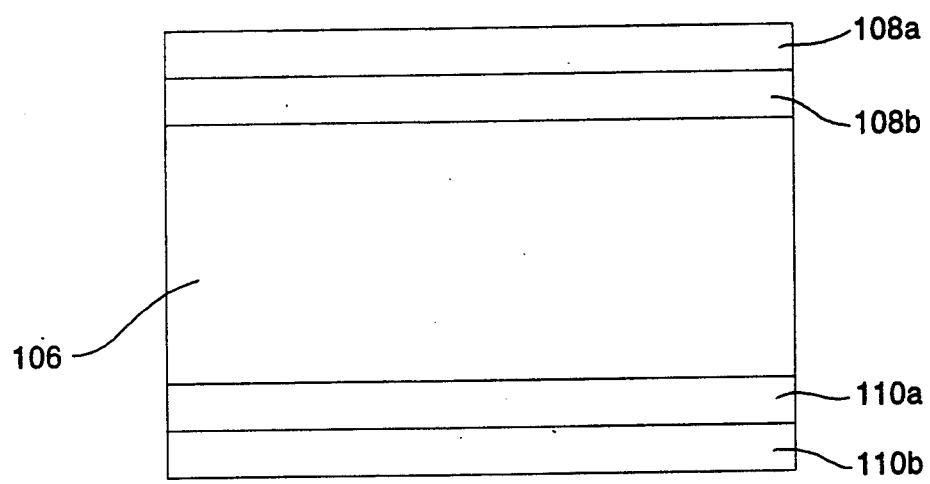
FIG. 6 is a diagram of a picture display space illustrating carrying right side panel scan line segments and vertical augmentation information in the upper horizontal band of the picture, and carring horizontal augmentation information and left side panel scan line segments in the lower horizontal band of the picture.

FIG. 6 illustrates a picture arrangement in which the upper black band 108 is divided into two segments 108a and 108b. The segment 108a contains e.g. right panel scan segments in compressed and shuffled format and the segment 108b contains a compressed and shuffled vertical augmentation signal. The lower black band 110 is similarly divided into two horizontal segments 110a and 110b. The segment 110a contains a horizontal augmentation signal, and the segment 110b contains the left side panel scan segments.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A method for encoding a wide-aspect-ratio raster scan television picture image in a manner which is downwardly compatible with existing narrower aspect ratio television picture display equipment, the encoding method including the steps of:

dividing the wide aspect ratio television picture image vertically into a central panel and two side panels respectively located at the right side and at the left side of the central panel not substantially greater than twenty percent of the area of the central panel wherein each one of a multiplicity of wide aspect ratio scan lines of the raster scan includes a central panel segment and two side panel segments, forming horizontal bands of scan lines at the top and bottom of a resultant raster scan picture image, adding each side panel segment to a predetermined scan line position within a predetermined scan line of one of the horizontal bands of scan lines at the top and the bottom of the resultant raster scan picture image so that a scan line thereof includes plural side panel segments in predetermined arrangement, placing the central panel in the space between the top and bottom horizontal bands of the resultant raster scan picture image, and putting out the resultant raster scan picture image.

2. The encoding method set forth in claim 1 wherein the step of forming horizontal bands comprises the step of forming each band so as not to exceed fifteen percent of the display area of the resultant raster scan picture image.

3. The encoding method set forth in claim 2 wherein each band is not substantially greater than ten percent of the resultant raster scan picture image.

4. The encoding method set forth in claim 1 comprising the further step of shuffling each side panel segment prior to adding it to the said horizontal band.

5. The encoding method set forth in claim 1 comprising the further step of compressing the scan lines of the central panel prior to placement into the said space between the top and bottom bands.

6. The encoding method set forth in claim 1 comprising the further step of amplitude compressing level transition in each side panel scan segment prior to its addition to the predetermined scan line position within the said band.

7. The encoding method set forth in claim 1 comprising the further steps of generating an augmentation signal for augmenting the quality of the said wide aspect ratio picture image, compressing eh augmentation signal into augmentation segments, and placing the augmentation segments into predetermined scan line positions within the top and bottom bands.

8. The encoding method set forth in claim 1 comprising the further step of separating chrominance components of the side panel scan line segments from chroma components of the central panel scan line segments, time compressing he separated side panel chroma scan line segments, and adding the time compressed and separated side panel chroma scan line segments at predetermined scan line positions within at least one of the top and bottom bands of luminance information.

9. The encoding method set forth in claim 1 wherein the step of adding each side segment to a predetermined scan line position within a predetermined scan line comprises the further step of time compressing luminance components of the said side panel segment.

10. A method for decoding for display a wide aspect ratio raster scan television picture image which has been encoded by the steps of:

dividing the wide aspect ratio television picture image vertically into a central panel and two side panels located at the left and right sides of the central panel and wherein the side panels are not substantially greater than twenty percent of the area of the central panel wherein each one of a multiplicity of wide aspect ratio scan lines of the raster scan includes a central segment and two side panel segments, forming horizontal bands of scan lines a the top and bottom of a resultant raster scan picture image, adding each side panel segment to a predetermined scan line position within a predetermined scan line of one of the horizontal bands of the resultant raster scan picture image so that a scan line thereof includes plural side panel segments in predetermined arrangement, placing the central panel in the space between the top and bottom horizontal bands of the resultant raster scan picture image, and putting out the resultant raster scan picture image; the decoding method including the steps of:

separating the top and bottom horizontal bands from the space therebetween, extracting the central panel scan segments from the space, extracting the side panel picture scan segments from the scan lines of the top or bottom bands, and adding the side panel picture scan segments to corresponding central panel scan segments in proper time relationship to restore the multiplicity of wide aspect ratio scan lines, and displaying the restored wide aspect ratio scan lines on a wide aspect ratio display.

11. The decoding method set forth in claim 10 wherein during encoding each side panel segment has been shuffled prior to its addition to the said position within the said horizontal band, and comprising the further decoding step of deshuffling each side panel segment after extracting it from the scan line and prior to adding it to the corresponding central panel scan segment.

12. The decoding method set forth in claim 10 wherein the encoding process includes the further step of compressing the scan lines of the central; panel prior to placement into the said space between the top and bottom bands and comprising the further decoding step of expanding the scan lines of the central segment after extraction from the central space.

13. The decoding method set forth in claim 10 wherein the encoding process includes the further step of amplitude compressing level transitions in each side panel scan segment prior to its addition to the predetermined scan line position within the said band and comprising the further step of amplitude decompressing each side panel scan segment following the extraction step and prior to addition to the corresponding central panel scan line segment.

14. The decoding method set forth in claim 10 wherein the encoding process includes the further steps of generating an augmentation signal for augmenting the quality of the said wide aspect ratio picture image, compressing the augmentation signal into augmentation segments, and placing the augmentation segments into predetermined scan line positions within the top and bottom bands; the decoding method comprising the further steps of extracting the augmentation segments from the predetermined scan line position, expanding the augmentation segments into a restored augmentation signal, and applying the augmentation signal to the multiplicity of wide aspect ratio scan lines thereby to augment the quality of the picture resulting therefrom on the side aspect ratio display.

15. The decoding method set forth in claim 10 wherein the encoding process includes the further steps of:
separating chrominance components of the side panel scan line segments from chroma components of the central panel scan line segments,
time compressing the separated side panel chroma scan line segments, and
adding the time compressed and separated side panel chroma scan line segments at predetermined scan line positions within at least one of the top and bottom bands of luminance information, and wherein the decoding method includes the further steps of:
extracting the time compressed and separated side panel chroma scan line segments from the predetermined scan line positions,
time expanding the extracted side panel chroma scan line segments, and
adding each extracted side panel chroma scan line segment to a corresponding luminance side panel segment to form a color composite segment and adding the color composite segment to a corresponding central panel segment to restore the multiplicity of wide aspect ratio scan lines.

16. The decoding method set forth in claim 10 wherein the encoding process step of adding each ise panel segment to a predetermined scan line position within a predetermined scan line includes the further step of time compressing luminance components of the said panel segment, and the decoding method comprises the further step of time decompressing the said luminance components of the said side panel segment prior to addition to the corresponding central panel segment.

* * * * *

UNITED STATES PATENT AND TRADEMARK OFFICE
CERTIFICATE OF CORRECTION

PATENT NO. : 5,097,332
DATED : March 17, 1992
INVENTOR(S) : Faroudja

It is certified that error appears in the above-identified patent and that said Letters Patent is hereby corrected as shown below:

Column 01
Line 35: "and be" should be --with and is--

Column 02
Line 06: "Y Araki" should be --Y. Araki--

Column 02
Line 18: "asethetically" should be --aesthetically--

Column 03
Line 29: "step" should be --steps--

Column 03
Line 50: insert --is-- between "panel" and "not"

Column 04
Line 66: "lineally" should be --linearly--

Column 05
Line 07: "pedistal" should be --pedestal--

Column 07
Line 15: "reassenbling" should be --reassembling--

Column 08
Lines 04-6: delete "Y chroma 79 is then added to central panel restored bandwidth"

Column 08
Line 25: "segment s" should be --segments--

Column 08
Line 37: "pedistal" should be --pedestal--

Column 08
Line 42: "pedistal" should be --pedestal--

Column 09
Line 55: in Claim 06, "transition" should be --transitions--

Column 09
Line 61: in Claim 07, "eh" should be --the--

Column 10
Line 24: in Claim 10, "a" should be --at--

UNITED STATES PATENT AND TRADEMARK OFFICE
CERTIFICATE OF CORRECTION

PATENT NO. : 5,097,332
DATED : March 17, 1992
INVENTOR(S) : Faroudja

It is certified that error appears in the above-identified patent and that said Letters Patent is hereby corrected as shown below:

```
Column 10
  Line 60:   in Claim 12, delete ";" after "central"
Column 11
  Line 22:   in Claim 14, "side" should be --wide--
Column 12
  Line 21:   in Claim 16, "ise" should be --side--
Column 12
  Line 25:   in Claim 12, insert --side-- between "said" and
             "panel"
```

Signed and Sealed this

Twelfth Day of October, 1993

Attest:

BRUCE LEHMAN

*Attesting Officer*      *Commissioner of Patents and Trademarks*